(No Model.)
H. R. WOLFE.
SAW SWAGE.
No. 315,104. Patented Apr. 7, 1885.
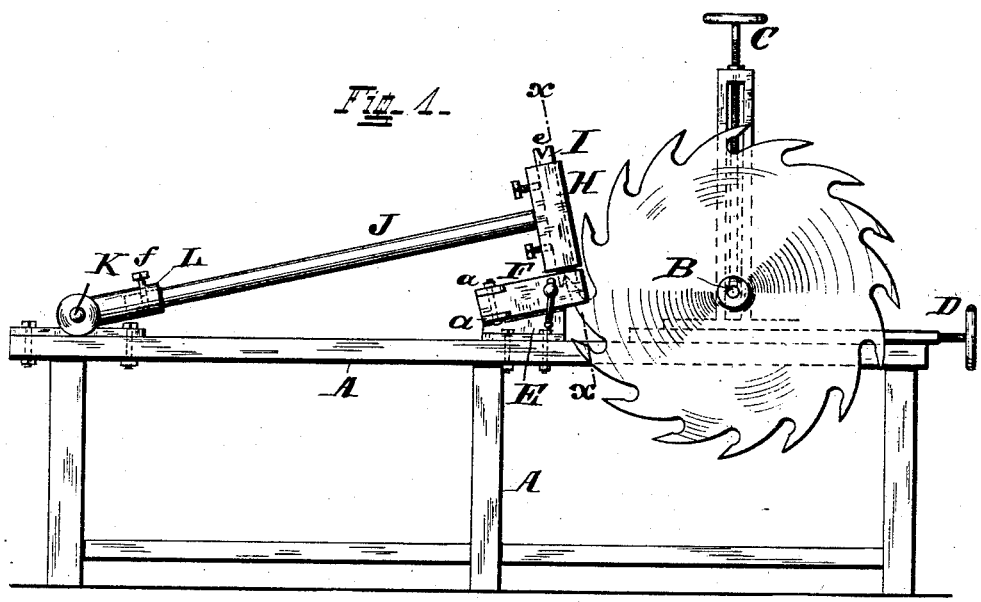
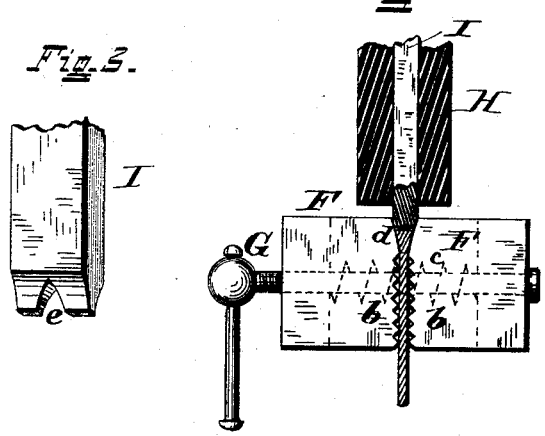
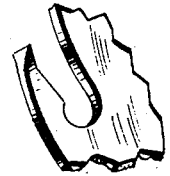
Attest
Carl Spengel
Ed W Rector
Inventor
Harvey R. Wolfe
by Stem & Eck his Att'ys.

UNITED STATES PATENT OFFICE.

HARVEY R. WOLFE, OF LOUISVILLE, KENTUCKY, ASSIGNOR TO THE BRENNAN & CO. SOUTHWESTERN AGRICULTURAL WORKS, AND CHARLES A. WOLFE, ALL OF SAME PLACE.

SAW-SWAGE.

SPECIFICATION forming part of Letters Patent No. 315,104, dated April 7, 1885.

Application filed June 21, 1884. (No model.)

*To all whom it may concern:*

Be it known that I, HARVEY R. WOLFE, a citizen of the United States, residing at Louisville, in the county of Jefferson and State of Kentucky, have invented certain new and useful Improvements in Saw-Swages, of which the following is a full, clear, and exact description, reference being had to the accompanying drawings, forming a part of this specification.

My invention relates to an improvement in that class of saw-swages especially adapted to circular saws, and has for its object the simplification of this class of machines, whereby greater efficiency is obtained both in forming the points of the teeth and rendering the saw true or round.

The novelty consists in the construction of the parts, as will be herewith set forth and specifically claimed.

In the accompanying drawings, Figure 1 is a side elevation of a saw-swaging machine embodying my invention. Fig. 2 is an enlarged sectional detail view through the dotted line $x\ x$ of Fig. 1. Fig. 3 is a detail view in perspective of one of the male dies. Fig. 4 is a perspective view showing the shape given to the point of the tooth by my swage.

The same letters of reference are used to indicate identical parts in all the figures.

A is any suitable frame-work or table, carrying an adjustable mandrel or pivot, B, on which the saw is hung. In this instance the mandrel can be adjusted vertically by the hand-wheel C and horizontally by the hand-wheel D, so as to enable saws of different diameters to be properly hung and adjusted for swaging.

Upon any suitable bed-piece or support, E, secured to the table is supported a pair of tooth-clamping jaws or dies, F, hinged or pivoted together at their rear ends by links $a$, or in any other suitable manner, and having their steel engaging faces roughened or serrated, as shown at $b$, Fig. 2. These jaws are drawn together to clamp the teeth by a screw, G, and are thrown apart to release the tooth by a spiral or other spring, $c$, (shown by dotted lines in Fig. 2;) or, if desired, the screw may be right and left threaded, so as to bring the jaws together when turned in one direction and throw them apart when turned in the opposite direction. The upper portions of the jaws are beveled, so as to form an enlarged tapering or V-shaped recess, as seen at $d$, Fig. 2, corresponding to the shape or lateral enlargement it is desired to give the point of the tooth, so that when the tooth is clamped by the jaws and the swaging-die is brought to act upon it the point of the tooth is spread or upset, as seen in Figs. 2 and 4.

H is any suitable die-stock, carrying a double-headed male die, I, whose sides are beveled off so as to fit in the tapering recess of the jaw-dies F, and having a notch or serration, $e$, to fit over the point of the tooth and force it in or out, as required, at the same time that it is being upset or spread. To secure uniformity in this operation, the die-stock H is secured upon the end of an arm or handle, J, which latter is suitably pivoted to the table at K, and, to enable either end of the male die I to be brought down upon the tooth, I swivel the arm J in a head, L, where it may be clamped by a set-screw, $f$. I also prefer to render the pivot K adjustable in and out upon the table to suit the requirements of the work to be done. From this construction it will be seen that the teeth of the saw can be quickly and successively clamped, and can be swaged perfectly true by the operator, who, by means of the handle J, can deliver as light or as heavy blows as may be necessary.

Having thus fully described my invention, I claim—

1. In a saw-swage, the tooth-clamping jaws or dies having their upper portions adjacent to the point of the tooth beveled to form a taper recess, substantially as described.

2. The combination, with the tooth-clamping jaws having their upper portions adjacent to the point of the tooth beveled to form a taper recess, of a notched or serrated male die so shaped as to fit into the aforesaid taper recess, and supported upon or by a pivoted handle, substantially as described.

3. The combination, with the tooth-clamping jaws having their upper portions adjacent to the point of the tooth beveled to form a taper recess, of a double-ended notched or serrated male die so shaped as to fit into the aforesaid taper recess, and supported upon or by a pivoted swiveled handle, substantially as described.

HARVEY R. WOLFE.

Witnesses:
FRANK ANDRIOT,
WM. WEST.